United States Patent
Schatt et al.

(10) Patent No.: US 9,359,170 B2
(45) Date of Patent: Jun. 7, 2016

(54) CODING DEVICE AND POSITION-DETERMINING DEVICE AND POSITION-DETERMINING METHOD

(71) Applicant: Cedes AG, Landquart (CH)

(72) Inventors: Michael Schatt, Pfaeffikon (CH); Marco Graf, Grabs (CH)

(73) Assignee: Cedes AG, Landquart (CH)

( * ) Notice: Subject to any disclaimer, the term of this patent is extended or adjusted under 35 U.S.C. 154(b) by 11 days.

(21) Appl. No.: 14/072,009

(22) Filed: May 21, 2014

(65) Prior Publication Data

US 2015/0102097 A1    Apr. 16, 2015

(30) Foreign Application Priority Data

Oct. 14, 2013    (EP) .................................... 13004910

(51) Int. Cl.
  *G06K 19/06*    (2006.01)
  *B66B 3/02*    (2006.01)
  *B66B 1/34*    (2006.01)

(52) U.S. Cl.
  CPC ................ *B66B 3/02* (2013.01); *B66B 1/3492* (2013.01); *G06K 19/06028* (2013.01); *G06K 19/06037* (2013.01); *G06K 19/06056* (2013.01)

(58) Field of Classification Search
  USPC ........................................ 235/375; 187/394
  See application file for complete search history.

(56) References Cited

U.S. PATENT DOCUMENTS

| 4,433,756 | A |  | 2/1984 | Caputo et al. |
| 5,821,477 | A |  | 10/1998 | Gerstenkorn |
| 2007/0227831 | A1 | * | 10/2007 | Zaharia .......................... 187/394 |
| 2013/0001023 | A1 |  | 1/2013 | Leutenegger et al. |

FOREIGN PATENT DOCUMENTS

| EP | 0 722 903 B1 | 5/2000 |
| EP | 2 540 651 A1 | 1/2013 |

OTHER PUBLICATIONS

International Search Report, International Application No. PCT/EP2014/002764, dated Jan. 27, 2015 (4 pages).

* cited by examiner

*Primary Examiner* — Daniel Hess
(74) *Attorney, Agent, or Firm* — Burr & Brown, PLLC

(57) ABSTRACT

In order to increase safety, a computer-implemented method is proposed for determining the position of a lift cabin in a lift shaft with the aid of a coding device, in which method a section of a code band and/or of the bearing device is/are recorded with an optical detection device as a pixel image consisting of pixels, a reference marking analysis is carried out, the pixel image is processed, in particular is assigned to a detection grid, pixels of the pixel image are preferably combined with the aid of their color and/or position in order to be able to read out the barcode and/or 2D code of the marking, the barcode and/or 2D code is converted to a binary code, the binary code is decoded by means of an algorithm and is converted into a position indication and/or into information as to whether a bearing device has been detected.

20 Claims, 7 Drawing Sheets

Pixel recording (100 x 24 x 12 bit)
Code band

Pair of pixel strips
(2 x 2 x 24 x 12 bit)

Extended image pattern
(with clip bars)
(8 x 7 x 1 bit)

Image pattern
(8 x 5 x 1 bit)

Position pattern
(8 x 3 x 1 bit)

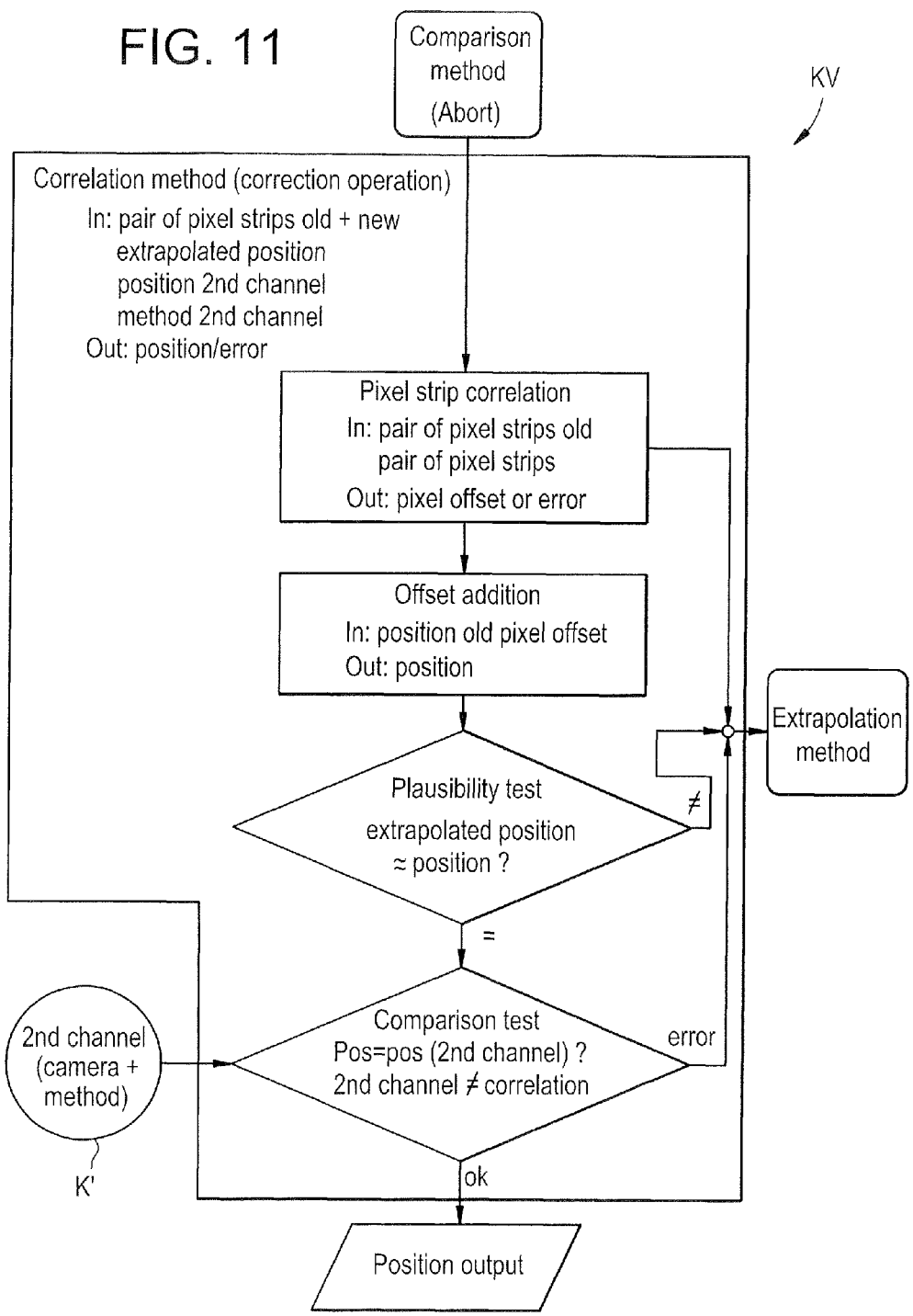

CODING DEVICE AND POSITION-DETERMINING DEVICE AND POSITION-DETERMINING METHOD

BACKGROUND OF THE INVENTION

Field of the Invention

The invention relates to a coding device for marking positions in a lift shaft and for determining the position of lift cabins in the lift shaft, to a computer-implemented method for determining the position of a lift cabin in a lift shaft with the aid of a coding device, and to a position-determining device.

SUMMARY OF THE INVENTION

An object of the invention is to be able to provide a code band, a position-determining method and a position-determining device which enable an increased level of safety in operating the lift.

The invention firstly makes available a code band in the case of which discrete positions are admittedly marked, but can, however, be provided in a density such that the lift cabin can occupy its position practically permanently. The control unit for controlling the lift travel, that is to say its closed-loop and/or open-loop control, can thus be provided permanently with the information relating to the current position of the travel cabin, and there are practically no distances along which the travel cabin is driven "blind", that is to say without concrete position information, and cannot react until it meets a marking which is intended, for example, to cause the cabin to brake. This measure enables a high degree of safety in operating the lift. In addition, the invention offers reliable and safe operation of the lift cabin, because the type of coding device and of computer-implemented method for determining the position enables inspection options, redundancies and plausibility checks by means of which high safety standards can be achieved. In particular, it is also possible to read out positions even when the code band is, for example, soiled and it is therefore no longer possible to read out all the information held there.

A further advantage of the invention consists in that precisely in connection with the use of a coding device according to an exemplary embodiment of the invention having bearing devices, there is, in addition, the possibility of being able to take account of the subsiding of a newly constructed building when evaluating and determining the position of the lift cabin, even of being able to correct the determination of position. Newly erected buildings mostly have the property that they "subside" with time, that is to say instances of compression can occur in the building in the course of time because of the high weight loads. This effect can occur precisely with high buildings, which mostly have a lift. It is a particularly problematic feature of this type of effect in the construction of buildings that not all parts of the building respond uniformly to this effect. In particular, as a rule, the lift structure in which the travel cabin is mounted to be driven is not affected thereby, or is at least only partially affected thereby. In such a case, the partial compression of the building wall means that the travel cabins are also displaced with respect to the frame of the lift shaft. This phenomenon of the subsidence of a building can be compensated such a correction, which is likewise enabled by the invention. In particular, it is possible thereby to increase the safety and reliability in operation of the lift.

The inventive coding device serves for marking positions in a lift shaft, and for determining the position of lift cabins in the lift shaft. It comprises a code band which is, for example, suspended and fastened in the lift shaft on the shaft wall in the region of the upper end of the shaft. The code band is mounted to move in the lift shaft via a bearing device. When, for example, the building subsides and is partially compressed inwardly, the code band can appropriately move downward together with the ceiling of the building and yet continue to hang freely, because it is mounted to move inside the bearing devices and not held fast. Consequently, the freely hanging code band must also not bend or be compressed during subsidence of the coding. The markings on the code band are provided along its length, specifically equidistantly. The markings can be designed as a barcode, but particularly preferably as 2D code (two-dimensional code). The code markings can be formed by matt black and reflective white squares. Firstly, such a 2D code visually delivers a particularly advantageous, simplified detection, but also a high density of coding options.

In principle, a barcode can be arranged in a row, as can likewise a 2D code (two-dimensional code). A 2D code is normally designed as a matrix, it being possible for the individual matrix elements to form bright or dark, that is to say the values 1 or 0. One or more rows together as a position pattern can mark a discrete position as such. It is particularly advantageous for this type of markings that they can not only be easily detected and read out, but also can be decoded by means of an algorithm and be processed mathematically. The advantage is likewise achieved thereby that it is possible to avoid complicated comparisons of images with reference patterns which, on the one hand, can be more prone to error but, on the other hand, also require computers of high graphic computing power and, moreover, necessitate memories with high capacity for storing the reference patterns. In accordance with the invention, the mathematical algorithm can be evaluated with the aid of a computer, and, if appropriate, even by means of a simple microcontroller or microprocessor. This advantage in time also enables the markings to be evaluated very quickly so that even in the case of high marking density, the travel cabin can be permanently informed of its position in the lift shaft during its trip.

BRIEF DESCRIPTION OF THE DRAWINGS

Exemplary embodiments of the invention are illustrated in the drawings and explained in more detail below with an indication of further details and advantages.

FIG. 11 shows a schematic illustration of the correlation method.

DETAILED DESCRIPTION OF THE INVENTION

Figure 1:
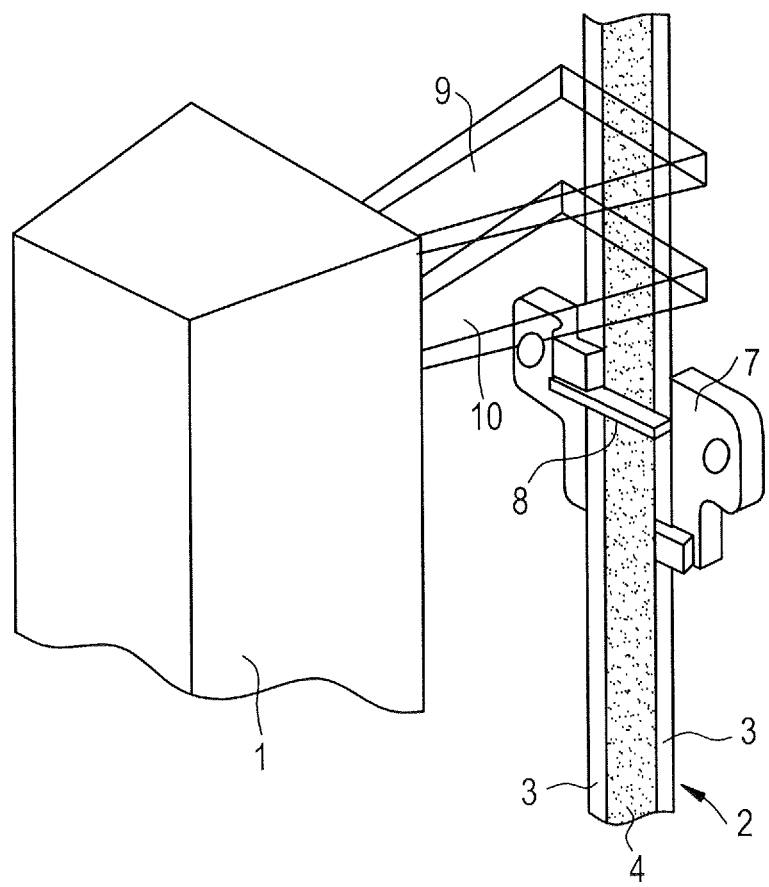
FIG. 1 shows the reading out of the coding device in accordance with the invention by an optical detector.

FIG. 1 shows a detection device 1 which reads out a code band 2 in a lift shaft. Provided for this purpose on the lateral edges of the code band are position strips 3 which laterally delimit the 2D code 4. The coding device comprises the code band 2 and a clip 7: the code band 2 is mounted to move with such clips 7 as bearing device such that it can be displaced in a longitudinal direction when, for example, the building subsides with time. The clip 7 comprises a bridge 8 which overlaps the code 4 and/or the position strips 3. The detection device 1 basically comprises two cameras whose detection beams 9, 10 for recording a detection image are likewise illustrated in FIG. 1.

Figure 2:
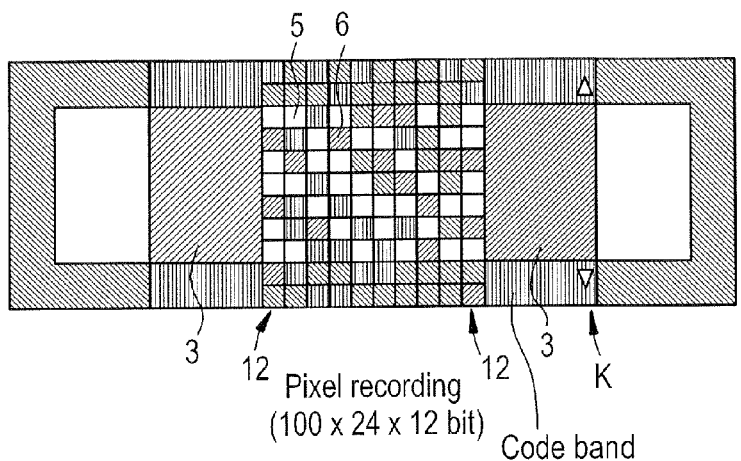
FIG. 2 shows a schematic illustration of a camera recording.

FIG. 2 shows the recorded image section 1 of the camera, which was recorded by the code band 2. The recording 1 overlaps the lateral edge of the code band 2. Position strips 3 are provided at the outer edges of the code band in a longitudinal direction of the code band 3. Said strips are completely black in design and are therefore easily detected by the detection device and the evaluation method. These position strips 3 likewise provide screening, such that the evaluation method is able to detect the region in which the 2D code 4 is to be found. The 2D code is composed of a matrix 4 which has individual matrix elements 5, 6. The matrix element 5 is a bright one, while the matrix element 6 is a dark one. However, in general, the matrix elements 5, 6 do not correspond in each case to a single pixel of the camera recording. Consequently, it is necessary when processing images to assign recorded pixels to one another in accordance with their position and their brightness and combine them to form a matrix element. In the combined image, in turn, a pixel then represents a matrix element. Specified in FIGS. 3 to 6 are sections processed by image processing B and in the case of which camera pixels have been processed to form matrix elements.

Figure 7:
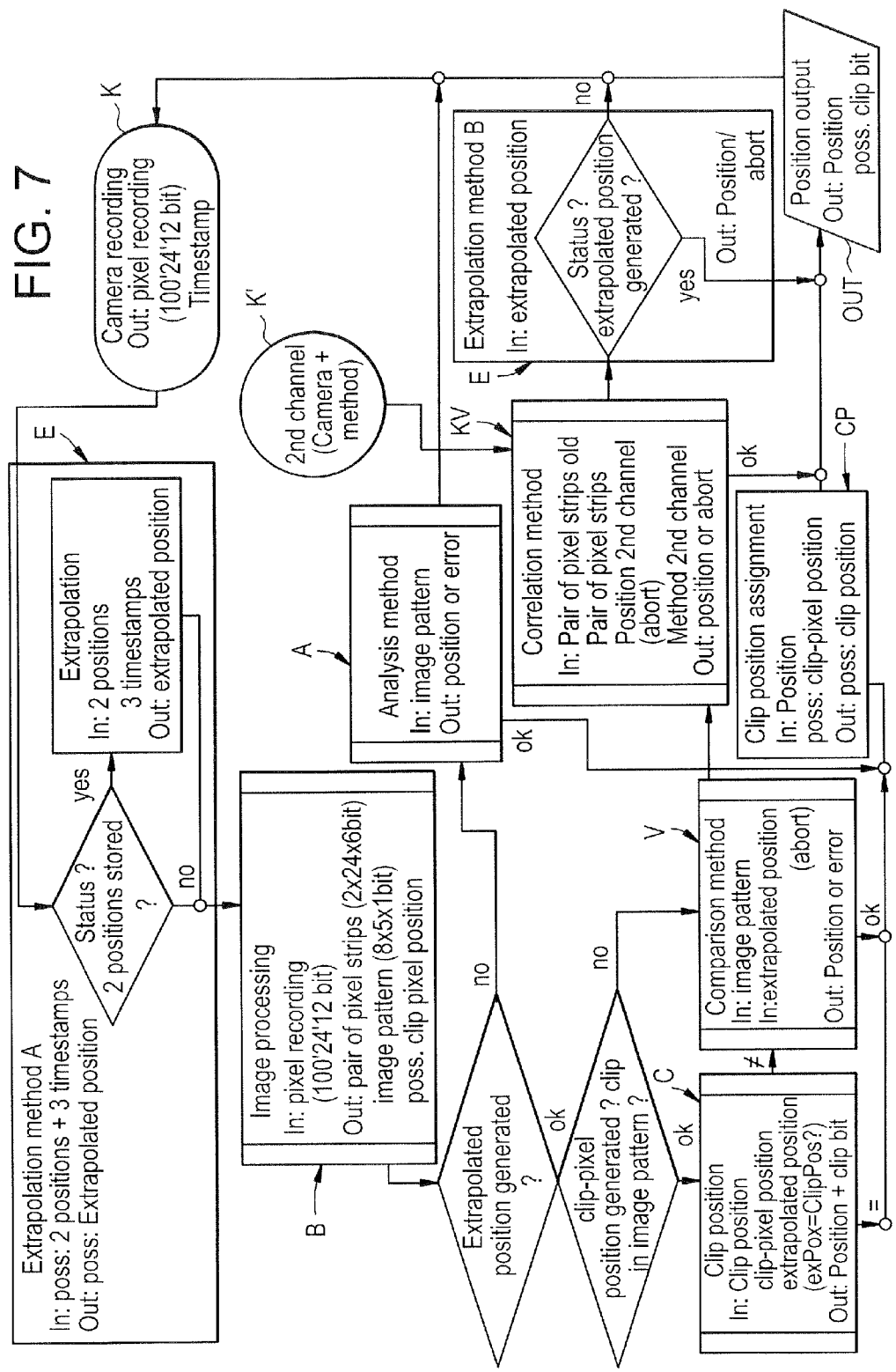
FIG. 7 shows an overall scheme of the computer-implemented method in accordance with the invention.

An overall illustration of a computer-implemented method for determining the position is illustrated in FIG. 7.

Camera Recording K

The detection device 1 enables optical detection of the markings 3, 4 provided on the code band 2. The camera (optionally including a plurality of cameras) generally operates in the infrared region (IR light, wavelength approximately greater than 780 nanometers to 1 millimeter), so that in particular, it is also possible to avoid interfering influences. If the cabin is traveling in the lift shaft in which the code band 2 is also suspended, said cabin will move along the code band, the camera being aligned such that it can correspondingly detect the code band. During the trip, the camera repeatedly takes recordings K of sections of the code band (in particular, in equal time intervals), compare FIG. 2. Such a pixel recording can typically comprise 100×24 pixels and be recorded as a grayscale image (for example 12-bit image). At the same time, in the present case a clock or a timer is provided which assigns a timestamp depending on the camera recording, that is to say a time information item, when the recording is finished. This timestamp later enables evaluation of the images when further information is known, that is to say, for example, individual positions at specific instants, speed of the lift cabin or acceleration of the lift cabin.

Extrapolation Method E

The aim of the overall method from FIG. 7 is to determine the position of the lift cabin, specifically at different instants, making it possible, as already described, for the individual positions also to be given by timestamps. In a further method step, a check is made after the camera recording K as to whether there have already been determined in a memory two positions in relation to which two timestamps are also present. If this is the case, the position can be determined at a further, third instant (extrapolation). If the cabin has not carried out any uniform movement, the extrapolation can be performed, if appropriate, by taking account of the speed, known from the open-loop or closed-loop control of the cabin, of the lift cabin, or the acceleration of the lift cabin. Given uniform movement of the lift cabin, the speed thereof can be determined from two positions and their timestamps, that is to say the time information item, once these positions have been reached. If there is no change in this speed, the position can correspondingly be obtained therefrom at a further, third, instant. If the lift cabin accelerates in this time, or if the lift cabin is braked in this time, this must be appropriately taken into account. These data, relating to the acceleration and, if appropriate, also to the speed, can be retrieved and read out in embodiments of the invention by the control device of the travel cabin (open-loop or closed-loop control). If fewer than two positions are stored after carrying out the camera recording, the next method step is adopted without extrapolation taking place.

Figure 8:
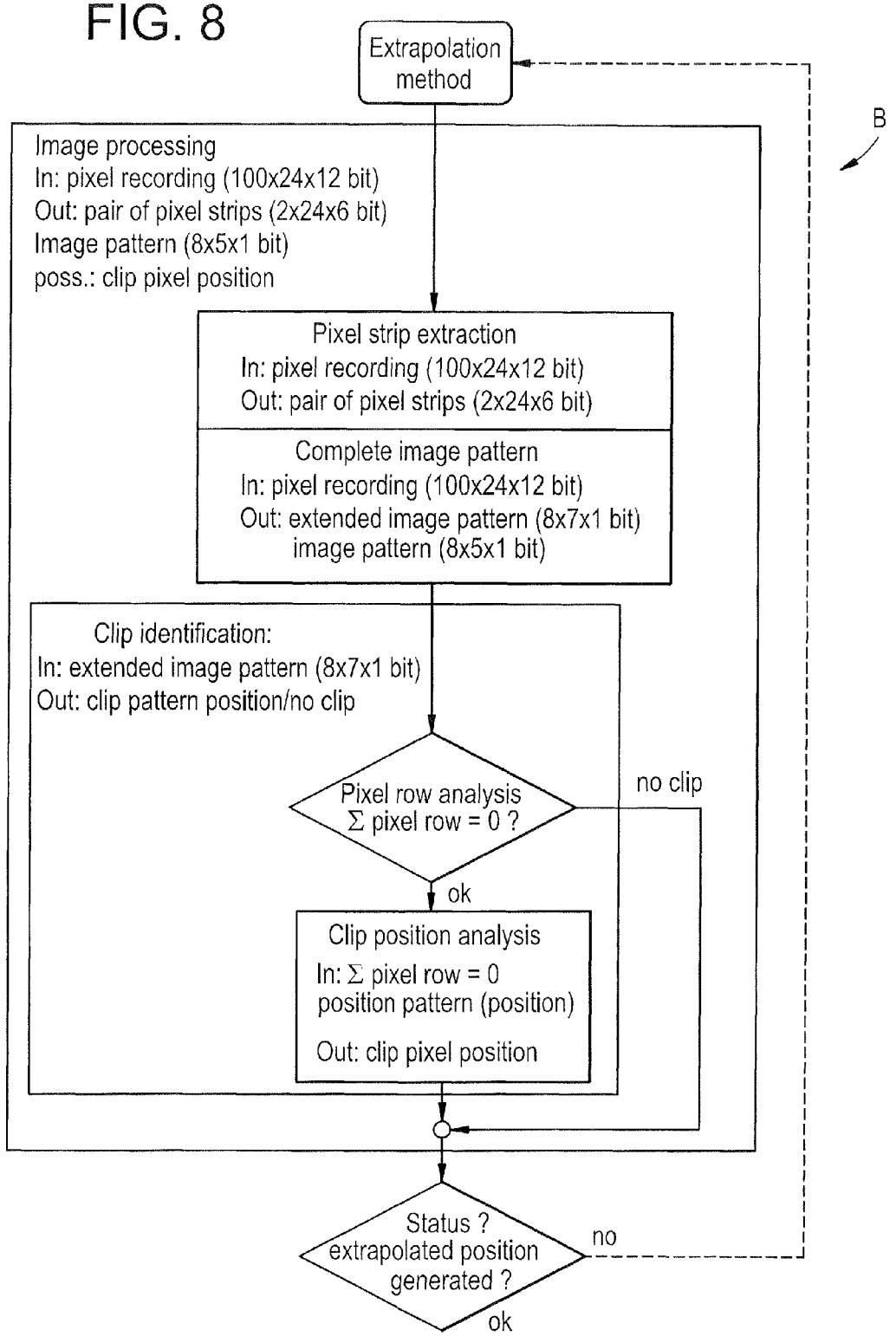
FIG. 8 shows a schematic illustration of the image processing.

Image Processing B (FIG. 8)

The next method step consists of image processing. A grayscale image has been recorded in the camera recording. It is also conceivable, in principle, to immediately record a black and white image, the more so as the code 4 imprinted on the code band 2 is designed as a barcode or 2D code, and therefore basically consists of only two colors or brightnesses. However, it must be taken into account that it is not always possible to exactly detect the same brightness values of a surface by influences from ambient light, deposits on the code band, slight differences in distance or in detection angle. Black surfaces then, as the case may be, appear more or less gray. In order to be able to take account of this effect, it is advantageous to record a grayscale image and to decide with the aid of the color, here with the aid of a threshold value of a grayscale or brightness, whether the detected surface or the detected pixel is to be assigned to a dark or a bright region with reference to a barcode or a 2D code. If appropriate, this threshold value can also be set as variable, thus likewise in principle enabling readjustment. For one thing, the recorded images can thereby be converted in principle into a 1-bit image. Secondly, it is to be borne in mind that a type of image detection or assignment to a screen is also performed in the image processing.

Figure 3:
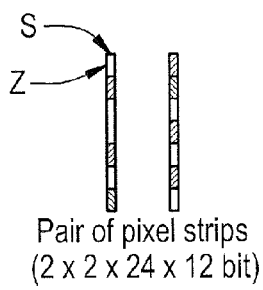
FIG. 3 shows a pair of pixel strips.

In this way, it is possible to separate (in the present case) two pixel strips which comprise 2×24 pixels and whose longitudinal extent runs along the columns S (compare FIG. 3).

Figure 4:
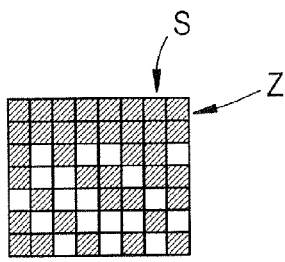
FIG. 4 shows an extended image pattern.
Figure 5:
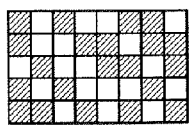
FIG. 5 shows an image pattern.

Furthermore, an image pattern and an extended image pattern are generated (FIGS. 4 and 5). The extended image pattern is illustrated in FIG. 4 and consists of 8×7 matrix elements in a black and white image, that is to say 1-bit representation. In these generated patterns, the matrix elements are represented in each case as a pixel in a fashion combined and reduced in size. The extended image pattern in accordance with FIG. 4 therefore has more rows Z than the image pattern in accordance with FIG. 5 because, as explained later, the bridge 8 of a bearing device 7 or of a clip can comprise three rows. In addition, each position marker, which has the complete information relating to a single position, comprises three rows in the present exemplary embodiment. If appropriate, additional rows may be required for individual evaluation methods.

The simple image pattern is illustrated in FIG. 5 and has only five rows, likewise illustrated in black and white, that is to say one-bit representation. The entire 2D matrix pattern comprises ten columns. The outer right and the outer left column 11 serve the purpose of separating position markers, that is to say coherent regions of the matrix which completely code a separate position, that is to say of marking where said position starts and stops. This is required so that in the event of random recording of an image it is clear where the position is marked and that parts of two different position markers are not being evaluated together, something which could result in an incorrect position indication. The rows of the matrix are arranged without spacing from one another in the present exemplary embodiment, thus enabling a higher density of the markings.

Figure 6:
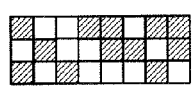
FIG. 6 shows a position pattern.

FIG. 6 shows a position pattern with only three rows, that is to say a position marker with the complete coding of a specific position.

As already described above, the code band is mounted to move in bearing devices for the movable bearing of the code band which are fastened on the wall of the lift shaft. These so-called clips 7 overlap the code band 2 toward the lift cabin (with the bridge 8), that is to say toward the side on which the marking of the code band is located. The clip, therefore, partially covers the code band in principle. At this point, the position would thus not be "detectable" in principle during a camera recording. Consequently, it is advantageous to detect the clip as such. The inventive coding device is particularly advantageous to the effect that the clip need not be detected as an image however, but that it can surprisingly be evaluated together with the code band. To this end, the bridge 8 of the clip, which projects beyond the code band and is detected, has a coding pattern which corresponds to that of the code band, that is to say a barcode or a 2D code.

It is particularly advantageous to configure the code mapped on the clip in as simple a way as possible, in particular, in a color of the barcode or 2D code coding, that is to say black or white or bright or dark. Firstly, the production of the clip is thereby simplified. Secondly, the clip can thereby be easily detected, something which is particularly advantageous because the construction phenomenon of the subsidence of buildings can entail the clip moving relative to the code band when the building subsides over time. The clip then changes its position relative to the code band upon subsidence of the building. It is therefore advantageous to provide only one of the markings with an absolute position indication, specifically either the code band or the clip, so that a comparison can be appropriately carried out. The clip can therefore be found by a mathematical analysis or the carrying out of an algorithm. This clip identification is performed in the image processing via the extended image pattern. A pixel pure analysis is performed in which the cross sum over the detected matrix elements is formed. In the present case, the clip is designed as black, and so a check is made as to whether the cross sum over the matrix elements yields zero. If this is the case, it can only be a clip which is concerned, since the coding is selected such that other rows cannot have the cross sum 0.

Since it is also known how many rows the clip is using, for example, three rows, its position can also be determined. If, for example, only one row is completely black at the upper image edge, the clip is correspondingly located in the upper region of the camera recording. If all rows of the clip can be detected, it is located at a corresponding point in the camera recording K. An immediately adjacent position can therefore be assigned by a completely mapped position marker. If, in the case of an embodiment, there is no longer enough space to detect a complete position marker, it is necessary, if appropriate, to derive the position of the clip via extrapolation, or to assign said clip an appropriate position. When detecting a clip, it is not always necessary to assign its exact position; it is always sufficient to assign the clips a position in the same way, for example, with a constant offset, since it is generally necessary to establish only relative distances between the clips, in order to establish, for example, how strongly a building has subsided. By way of example, the lower edge of the clip is determined with regard to its position in the present case.

Clip Position C:

In a further method step, it is established whether an extrapolated position has already been generated at all. If it is the case, it is further decided whether it was possible to identify a clip and whether a clip pixel position has been obtained. If this is likewise to be answered in the affirmative, the next partial method is that of determining C the clip position (FIG. 7). With the aid of the prior information relating to the clip position, the extrapolation method E is used to extrapolate a position of the clip. If this extrapolated position corresponds at least approximately to the clip position, the extrapolated position is output as position and, if appropriate, so also is an information item as to whether a clip was present or not. This information item can be designed as a 1-bit information item (clip bit). Finally, the clip is assigned its corresponding position (method step CP) and output. The clip position itself can likewise be stored and used later for a correction when the building has subsided.

If, by way of example, the lift has only just started and for this reason two positions have not yet been stored, the so-called analysis method A is firstly carried out.

Figure 9:
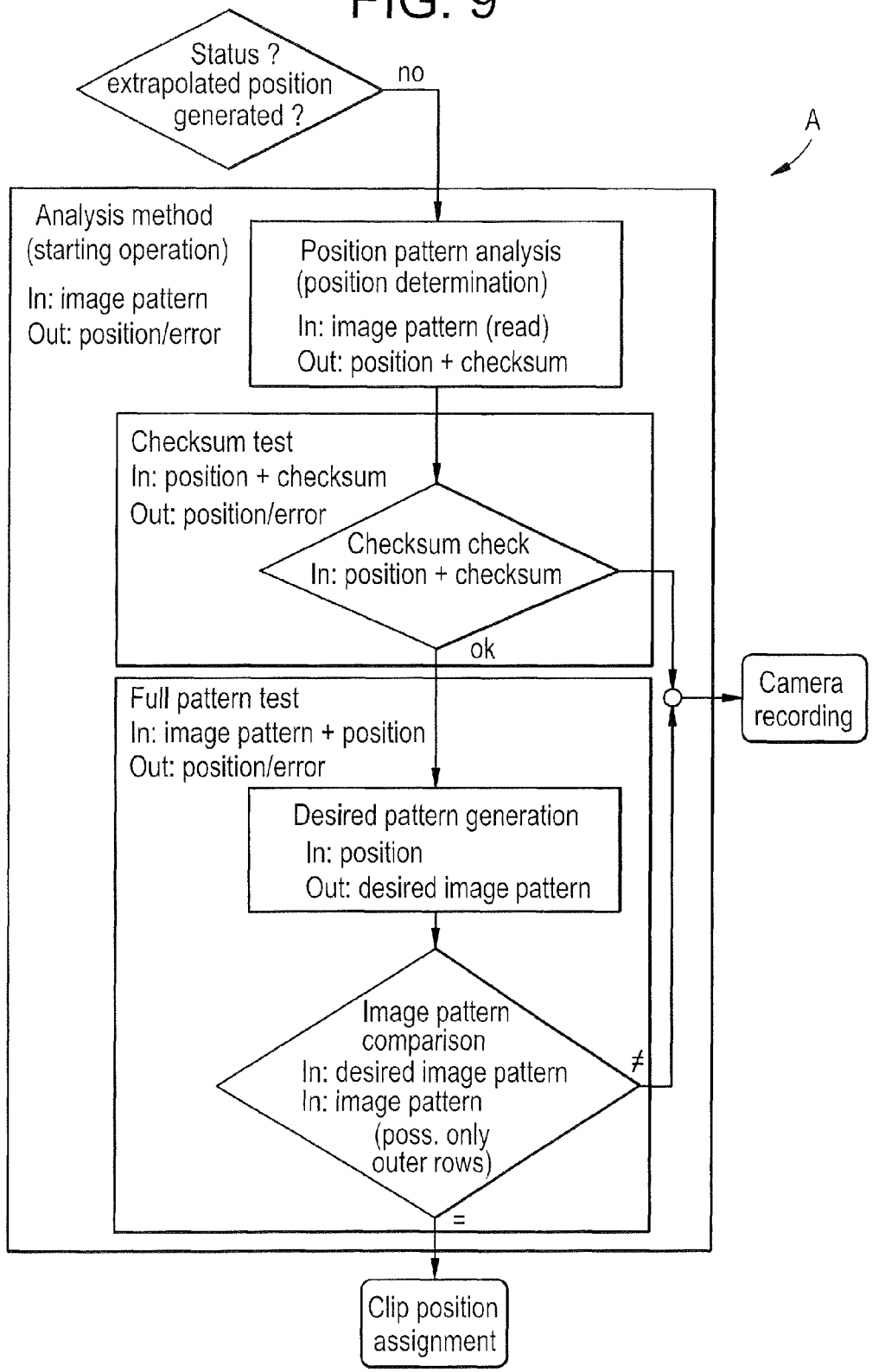
FIG. 9 shows a schematic illustration of the analysis method.

Analysis Method A (FIG. 9)

In the analysis method, the image pattern determined by the camera is firstly used to undertake a checksum test, that is to say a check is made as to whether the detected matrix elements yield a special checksum. In addition, the position marker (FIG. 6) is determined with the aid of the lateral edges 11, and the position of the recorded image is determined with the aid of the prescribed algorithm. The calculated position serves in the present case to infer with the aid of the inverse method of the algorithm which further rows border on the position marker. These have likewise also been recorded by the camera. A comparison is then undertaken as to whether these calculated patterns also correspond to that of the regions bordering on the position markers. These regions, which border on the position marker, therefore do not need to be used in addition to calculating a position. Depending on how many of the upper and lower edge regions are indicated inside the camera recording K, this is, as the case may be, not even possible straight away. If these generated codings correspond to the actually recorded codings, it may be concluded with very high probability that the position indication is actually correct. This position can then be output (position output OUT in FIG. 7), it likewise being possible, optionally, to perform an additional assignment of the clip position when a clip has been detected. If an extrapolated position has been generated, but no clip recorded, the comparison method is carried out.

Figure 10:
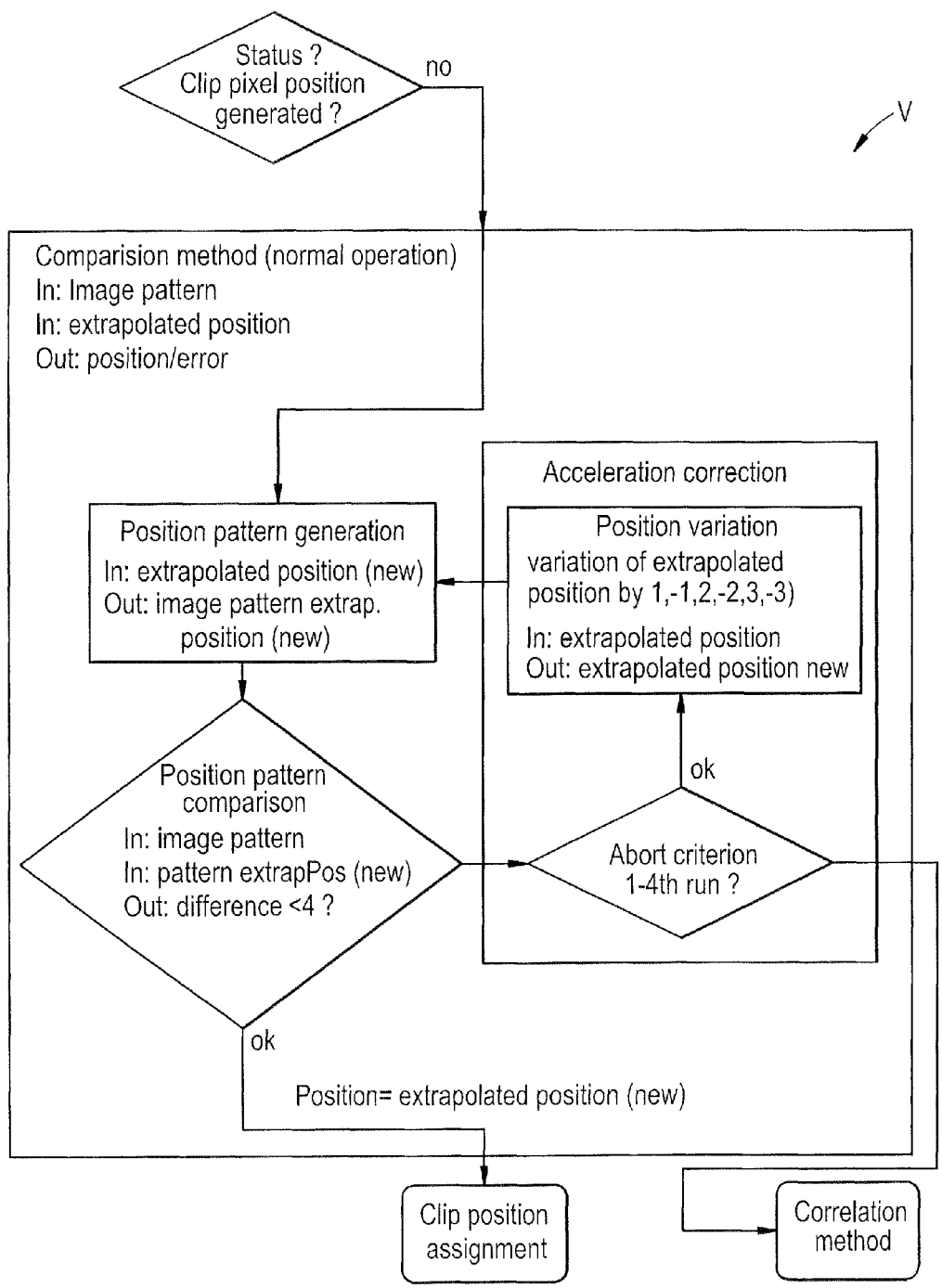
FIG. 10 shows a schematic illustration of the comparison method.

Comparison Method V (FIG. 10)

Apart from the image pattern, the extrapolated position is required for the comparison method (FIG. 7). The image pattern to be expected is determined from the extrapolated position alone and compared with that actually recorded. If the comparison is exactly correct, it can be deduced therefrom that the correct position has actually been found, and the extrapolated position is output as the position indication OUT. However, it can happen that although the extrapolated position and the actual position correspond, the recorded image can nevertheless be incorrectly processed because, for example, the code band is soiled at some points, or because other disturbing influences have played a role. If the code is selected such that only one or only a few matrix elements do not change from one row to the next, it is possible to tolerate a slight deviation in the case of a few matrix elements, and nevertheless to assume that the extrapolated position is actually present and corresponds to that recorded. In the present case, this can, for example, be assumed whenever fewer than four matrix elements deviate. It is particularly advantageous to this end to select the coding for reasons of safety such that said coding can deviate strongly from one row Z to the next. For example, the algorithm can provide a code in the case the matrix elements are interchanged in a prescribed way as a function of the position of the row, something which can easily be implemented when the algorithm known. However, if the deviation is too large, a method can be carried out with an acceleration correction. Particularly when the lift cabin is accelerated or decelerated while it is traveling uncertainties occur with regard to the extrapolation, since these changes in speed in time would need to be detected accurately, and the speed would have to be detected by integrating the acceleration over time. For technical reasons, this cannot generally be undertaken so accurately that deviations would be inconceivable, especially as the markings, for example, are provided with a spacing of half a millimeter.

If an acceleration correction is carried out with a type of position variation, this would firstly likewise require the extrapolated position indication. The image pattern is now generated on the basis of the extrapolated position indication, which has been calculated, as are the further rows, which directly border on the position marker of the generated image pattern. The recorded pattern is thus compared with image patterns which are to be found one, two or three lines above the image pattern, since it corresponds to the extrapolated position indication. If the recorded image pattern exists in this region, it can be assumed that the position determination has deviated within a tolerable limit, and that the extrapolated position is the output position. If this comparison also delivers no result, a correlation method is carried out. The pair of pixel strips known from FIG. 3 is used to this end.

Correlation Method KV (FIG. 11)

The first requirement is the generated pair of pixel strips (see FIG. 3), specifically in each case a current pattern and a pattern previously recorded during the trip. These pixel strips, which have been recorded at different times, are, to a certain extent, laid one over another and displaced until agreement is reached. In this case, the determination is done in accordance with the offset. In addition, a plausibility check can be carried out with the aid of the extrapolated position. Since the detection device comprises two cameras overall, a second comparison can also be carried out during the correlation method KV with the aid of a second camera (second camera image K in FIG. 7), and examined for consistency. When this correlation method KV also leads to no consistent result, a further extrapolation method E which proceeds analogously to that described above can be carried out once again. When this also leads to no result, it is necessary to carry out a new camera recording, since no position can be determined. If appropriate, a case of emergency is output when no position at all can be determined.

It is also conceivable in principle, in particular, to combine the analysis method, the comparison method or the correlation method with one another in another way, for example, in a different sequence.

LIST OF REFERENCE SYMBOLS

1 Detection device
2 Code band
3 Position strip
4 2D code
5 Matrix element
6 Matrix element
7 Clip
8 Bridge
9 Detection lighting
10 Detection lighting
11 Marking columns
A Analysis method
B Image processing
C Determination of the clip position
CP Clip position assignment
E Extrapolation method
K Camera recording
K' Second camera recording
KV Correlation method
V Comparison method
OUT Position output
S Column
Z Row

The invention claimed is:

1. A computer-implemented method for determining a position of a lift cabin in a lift shaft comprising:
   optically recording a section of a code band and at least one section of a bearing marking,
   assigning a time stamp to the optical recording of the section of the code band and the at least one section of the bearing marking for analysis,
   image processing of the optical recording of the section of a code band and the at least one section of the bearing marking to form a pixel image consisting of pixels,
   performing position pattern analysis comprising identifying code markings in the pixel image, identifying a position pattern from the code markings, converting the position pattern to binary code, and decoding the binary code into a position, and
   performing reference marking analysis comprising reading at least one line of the pixel image or code markings in a region for code markings to be expected, converting the read-out pixels or groups of adjacent pixels to number codes, comparing the number codes or sums of the number codes with a threshold value, identifying a reference marking as a function of the comparison, and determining the position of the lift cabin from the analysis of the optical recording of the section of the code band and the at least one section of the bearing marking and the assigned time stamp.

2. The computer-implemented method according to claim 1, further comprising position allocation comprising assigning a position for the reference marking as a function of the position of a position pattern, and identifying the reference marking and decoding the position based on a same pixel image.

3. The computer-implemented method according to claim 1, wherein the pixel image is a grayscale image.

4. The computer-implemented method according to claim 1, wherein the code markings are identified using a grayscale threshold value for conversion to a black and white image.

5. The computer-implemented method according to claim 1, wherein the position of a reference marking is stored at different instants.

6. The computer-implemented method according to claim 1, wherein the positions assigned to a reference marking at different instants are compared.

7. The computer-implemented method according to claim 6, wherein the decoded position of a code marking is corrected as a function of the comparison of the positions assigned to a reference marking at different instants.

8. The computer-implemented method according to claim 1, wherein the readout pixels or groups of pixels are converted to grayscale values.

9. A coding device designed to carry out the computer-implemented method of claim 1, the coding device comprising:
- a code band including optical code markings composed of at least two code colors that form position patterns that mark discrete positions, and
- a marking device fastened on the lift shaft including a reference marking that at least partially covers a region of the code markings transverse to the course of the code band, and has a color that corresponds to a code color.

10. The computer-implemented method according to claim 1, wherein a coding device comprises:
- a code band including optical code markings composed of at least two code colors that form position patterns that mark discrete positions, and
- a marking device fastened on the lift shaft including a reference marking that at least partially covers a region of the code markings transverse to the course of the code band, and has a color that corresponds to a code color.

11. A position-determining device for determining a position of a lift cabin in a lift shaft, comprising:
- a coding device comprising:
  - a code band including optical code markings composed of at least two code colors that form position patterns that mark discrete positions, and
  - a marking device fastened on the lift shaft including a reference marking that at least partially covers a region of the code markings transverse to the course of the code band, and has a color that corresponds to a code color; and
- a detection device for optically reading out the code markings and a computer for carrying out the computer-implemented method of claim 1.

12. The position-determining device according to claim 11, wherein a recording device is designed to record a pixel image having at least one position pattern and at least a part of the reference marking.

13. A coding device for determining a position of a lift cabin in a lift shaft, comprising:
- a code band including optical code markings composed of at least two code colors that form position patterns that mark discrete positions, and
- a marking device fastened on the lift shaft including a reference marking that at least partially covers a region of the code markings transverse to the course of the code band, and has a color that corresponds to a code color,
- wherein a section of the code band and at least one section of the marking device are optically detected in the lift shaft and assigned a time stamp for determining the position of the lift cabin in the lift shaft.

14. The coding device according to claim 13, wherein the reference marking is formed by a surface which is at an angle to the surface of the code band such that a light beam running perpendicular to the code band is not retroreflected perpendicularly by the surface.

15. The coding device according to claim 13, wherein the marking device comprises a bearing device for bearing the code band in the lift shaft such that the code band can move longitudinally in the lift shaft.

16. The coding device according to claim 13, wherein the two code colors have different grayscale values.

17. The coding device according to claim 13, wherein the two code colors are black and white.

18. The coding device according to claim 13, wherein the position patterns are a barcode and/or a 2D code.

19. The coding device according to claim 13, wherein the code color of the reference marking is black.

20. The coding device according to claim 13, wherein the surface forming the reference marking is at an angle of 20 to 80 degrees to the surface of the code band.

* * * * *